Aug. 1, 1961  O. BUFF ET AL  2,994,242
EXPANDING SLEEVE RELEASABLE SELF-LOCKING DEVICE
Filed Oct. 30, 1957

INVENTORS
ORVALLE BUFF
EUGENE A. KOPPEL JR.
BY
ATTORNEYS

United States Patent Office 2,994,242
Patented Aug. 1, 1961

2,994,242
EXPANDING SLEEVE RELEASABLE SELF-LOCKING DEVICE
Orvalle Buff, Palm City, Calif. (704 Coronado Ave., Imperial Beach, Calif.), and Eugene A. Koppel, Jr., 2412 Bailey Ave., San Diego, Calif.
Filed Oct. 30, 1957, Ser. No. 693,495
2 Claims. (Cl. 85—2.4)
(Granted under Title 35, U.S. Code (1952), sec. 266)

The invention described herein may be manufactured and used by or for the Government of the United States of America for governmental purposes without the payment of any royalties thereon or therefor.

This invention relates to locking devices and more particularly to a self-locking device capable of being installed, tightened, and released from one end thereof.

In the fabrication of adjacent structural members having accessibility from only one side, there is a need of a device for drawing the members together. For example, in the replacement of the outer skin portions in inaccessible locations on an aircraft, the clamping device must be capable of being inserted through existing openings in the respective skin and the frame to draw the parts snugly together until they can be permanently secured. Such a clamping device must of necessity be applied and tightened from only one side and secure the members together without slippage. Furthermore, the device must be releasable from the same side as it was tightened, and be removed from the members as an integral assembly without loss of parts.

A preferred embodiment of a clamping device constructed according to the present invention is capable of accomplishing the foregoing requirements in a simple and expedient manner, and is reusable as a tool. The device comprises a straight bolt having a tip end and a threaded end, the latter provided with a clamping nut. Intermediate the two ends, the bolt is formed with a peripheral annular recess in which is housed and restrained a cylindrical sleeve made preferably of resilient material such as spring steel. One end of the sleeve adjacent the tip end of the bolt is constructed with spaced longitudinal fingers capable of being spread radially outwardly when cammed over the tip end creating a nut-like protuberance. The other end of the sleeve is enclosed in a casing, the parts being slidably connected by catch means which initially locks the sleeve and casing together to enable the bolt to be withdrawn from the sleeve deforming the fingers. Thereafter, the catch means is actuated to release the sleeve and permit it to be advanced toward the deformed fingers by the clamping nut securing the structural members therebetween.

A principal object of this invention is to provide a clamping device that can be installed, tightened and released, if desired, from the same side of the structure to be clamped for reuse.

Another object is to provide a clamping device having deformable fingers capable of creating a nut-like protuberance on an inaccessible side of structural parts to be clamped; and a corollary object is to enable said nut-like structure to be controlled from the opposite and accessible end of the device.

Other objects and many of the attendant advantages of this invention will be readily appreciated as the same becomes better understood by reference to the following detailed description when considered in connection with the accompanying drawings wherein.

Figure 1:
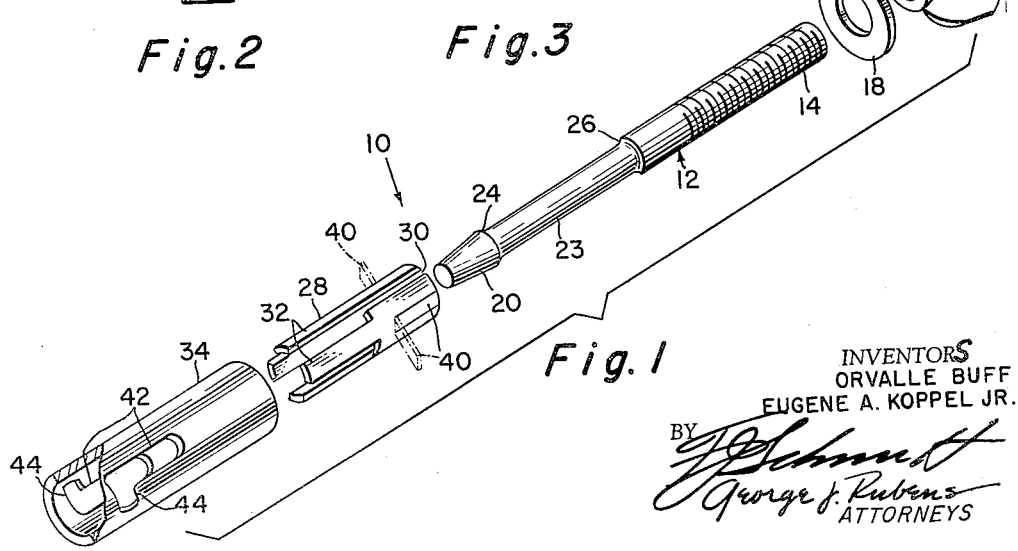
FIG. 1 is an exploded perspective view of the components of invention clamping device.

Referring to the drawing where like numerals refer to similar parts throughout the drawing there is shown in FIG. 1 an exploded view of the various parts comprising a novel clamping device 10. The clamping device includes a bolt 12 having a threaded end 14 for receiving a clamping wing nut 16 and associated washer 18, the other end of the bolt having a tapered tip 20 for facilitating passage through aligned openings 21a, 22a in the structural elements 21, 22 to be clamped together. Bolt 12 has an annular recess 23 adjacent tip 20 providing opposite disposed cam shoulders 24 and 26 between which is restrained a sleeve 28. Sleeve 28 is preferably constructed of spring sheet metal longitudinally split at 30 to facilitate slippage over tip 20 and snap-fitting in recess 23. The end of sleeve 28 adjacent shoulder 24 is longitudinally slotted providing a plurality of deformable fingers or tines 32 (four being illustrated), the ends capable of being flared by engagement with shoulder 24. The outer diameter of the assembled sleeve and bolt is less than the diameter of the aligned openings in the elements to permit free passage therethrough.

Figure 2:
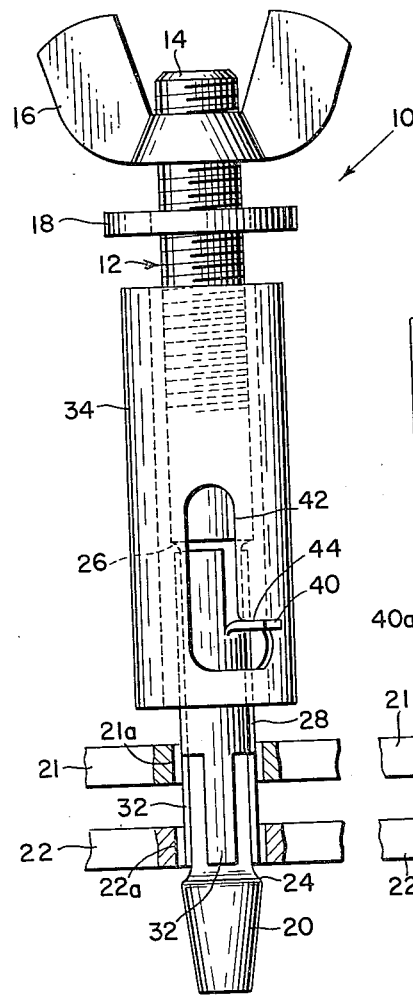
FIG. 2 is an enlarged view of the clamping device initially inserted through openings in a pair of plates to be clamped.
Figure 3:
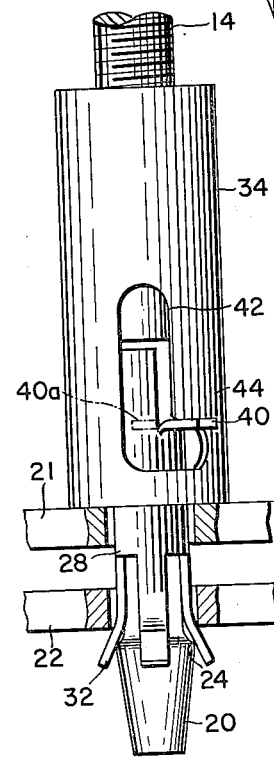
FIG. 3 is a similar view in a pre-clamping action in which the inner sleeve is locked to the casing to enable the sleeve fingers to be deformed by the bolt on the opposite side of the plates.
Figure 4:
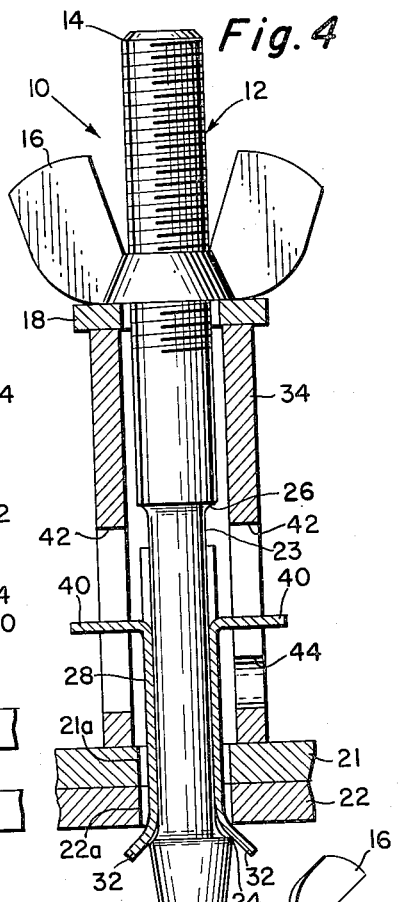
FIG. 4 is a longitudinal section of the device in clamping position, the pair of plates being drawn together by the wing clamping nut between the casing and the deformed fingers.

A casing 34 is concentrically positioned around the other end of sleeve 28, longitudinally between wing bolt 16 and the structural elements 21 and 22 as shown in FIGS. 2–4. Casing 34 and sleeve 28 are slidably restrained together by a pair of oppositely disposed lugs 40 struck out of the sleeve, the lugs adapted to slide in a pair of oppositely disposed longitudinal slots 42 in the casing.

To facilitate the concentric assembly, lugs 40 are struck up from the periphery of sleeve 28 to the perpendicular position (see broken line position in FIG. 1) after casing 34 is positioned over the sleeve. Slots 42 are provided with transverse extensions 44 extending in the same peripheral direction, while extensions function as detents to restrain sleeve 28 when bolt tip 20 is withdrawn to deform fingers 32 (see FIGS. 2 and 3). Or conversely, detents 42 enable sleeve 28 to be advanced over the bolt tip 20. The result is the same in either procedure, namely, fingers 32 are cammed outwardly to form nut-like protuberance. Thereafter, casing is rotated sufficiently to release lugs 40 from detents 44 to permit the wing nut 16 to be tightened clamping structural elements together in a manner presently to be described.

The operation of the assembled clamping device is readily apparent from FIGS. 2–4 inclusive. Structural elements 21 and 22 may be the outer skin and frame, respectively, of an aircraft which is to be drawn together by the invention clamping device 10 until they can be permanently secured by riveting or the like. As shown in FIG. 2, clamping device 10 is inserted from an outside accessible position of the structure through existing openings in the elements until bolt tip 20 and the free ends of fingers 32 are positioned on the opposite inner surface of the elements, normally an inaccessible side. Lugs 40 are rotated to engage detents 44 enabling bolt 12 and sleeve 28 to be moved relatively in a direction to flare the free ends of fingers 32 over shoulder 24 to the pre-clamping position shown in FIG. 3. In this position the flared ends of the fingers function as a nut or shoulder to lock the device on the inside of the structural elements.

To clamp the elements together as shown in FIG. 4, the casing is then rotated to disconnect lugs 40 from detents 44 (see broken line position 40a in FIG. 3) aligning the former with slots 42 and permitting the sleeve and bolt to be moved together when wing nut 16 and washer 18 are advanced on bolt 14. The plates are drawn together between the end of the casing and the flared ends of the fingers being wedged between bolt tip 20 and element 22.

For detaching the clamping device from the structural elements the wing nut is backed-off, and bolt 12 is pushed toward the elements to permit the resilient flared ends of fingers 32 to snap back into seating engagement with recess 23. Bolt 12 and sleeve 28 can now be withdrawn from the structural elements, and the device reused following the procedure heretofore set forth.

It should be noted that the clamping device is completely manipulated in all of the foregoing steps from only one side of the elements to be clamped making it particularly suitable for installations where only one side of the structural elements is accessible. The device comprises a minimum number of parts of simple yet rugged construction, and provides a positive clamping action under high stress. The clamping device can be easily installed, and, when used as a tool, quickly detached without frequent replacement of parts.

Obviously many modifications and variations of the present invention are possible in the light of the above teachings. It is therefore to be understood that within the scope of the appended claims the invention may be practiced otherwise than as specifically described.

We claim:

1. A self-locking device for clamping elements together having aligned apertures comprising a sleeve member having uniform inside and outside diameters and so dimensioned to permit free passage through said apertures, said sleeve member having a plurality of deformable fingers extending parallel to a longitudinal axis of the sleeve, a bolt extending axially in said sleeve, said bolt having cam means on one end for deforming said fingers in a direction transversely the axis to engage one of the apertured elements, an outer casing member having uniform inside and outside diameters slidably mounted around said sleeve, a lug on said sleeve extending through a slot opening in said casing so that the lug is visible external to the device, said slot having two legs, one leg being elongated and longitudinal to said casing for allowing the sleeve to move longitudinally within the casing and the other leg being transverse to the casing allowing the lug to engage the casing thereby interlocking the casing and sleeve in a longitudinal fixed relationship, a nut threaded on the other end of the bolt to bear against the casing for moving the interlocked members relative to the bolt initially to deform said fingers, said sleeve being rotatable for disengaging said lug from the transverse leg of the slot to free said members, whereby the casing can be advanced relative to the sleeve and further advanced relative to the bolt to engage another of the elements for clamping said elements snugly together between the casing and the deformed fingers.

2. The device of claim 1 wherein said sleeve is made of sheet metal and the lug is struck out of the sleeve periphery and normal thereto through the longitudinal leg of the slot in said casing whereby the lug can be formed after the sleeve is positioned within said casing.

References Cited in the file of this patent

UNITED STATES PATENTS

| | | |
|---|---|---|
| 1,322,905 | Just | Nov. 25, 1919 |
| 1,487,291 | Tomkinson | Mar. 18, 1924 |
| 2,047,714 | Smith | July 14, 1936 |
| 2,252,132 | Mazveskas | Aug. 12, 1941 |

FOREIGN PATENTS

| | | |
|---|---|---|
| 569,050 | France | Jan. 3, 1924 |
| 413,403 | Great Britain | July 19, 1934 |
| 348,974 | Italy | Feb. 23, 1937 |
| 885,327 | France | May 24, 1943 |
| 964,157 | France | Jan. 25, 1950 |